United States Patent
Akutsu

(10) Patent No.: US 7,222,972 B2
(45) Date of Patent: May 29, 2007

(54) PROJECTION APPARATUS, PROJECTION METHOD AND RECORDING MEDIUM HAVING RECORDED PROJECTION METHOD

(75) Inventor: Takashi Akutsu, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 210 days.

(21) Appl. No.: 11/028,804

(22) Filed: Jan. 3, 2005

(65) Prior Publication Data
US 2005/0151934 A1 Jul. 14, 2005

(30) Foreign Application Priority Data
Jan. 9, 2004 (JP) ............... 2004-004239

(51) Int. Cl.
G03B 21/00 (2006.01)
G03B 21/14 (2006.01)

(52) U.S. Cl. ...................... 353/69; 353/121

(58) Field of Classification Search ............ 353/69, 353/70, 121
See application file for complete search history.

(56) References Cited

U.S. PATENT DOCUMENTS

| | | | |
|---|---|---|---|
| 6,049,385 A * | 4/2000 | Norita et al. ............... 356/613 |
| 6,416,186 B1 * | 7/2002 | Nakamura .................. 353/69 |
| 6,592,227 B2 | 7/2003 | Ouchi et al. |
| 6,592,228 B1 * | 7/2003 | Kawashima et al. ........ 353/101 |
| 6,598,979 B2 | 7/2003 | Yoneno |
| 6,765,544 B1 | 7/2004 | Willson et al. |
| 6,846,081 B2 | 1/2005 | Mochizuki et al. |
| 6,886,946 B2 * | 5/2005 | Eguchi ........................ 353/101 |
| 6,923,546 B2 | 8/2005 | Kurematsu |
| 6,962,416 B2 * | 11/2005 | Ohara ......................... 353/70 |
| 6,974,217 B2 | 12/2005 | Kimura et al. |
| 2002/0105623 A1 | 8/2002 | Pinhanez |
| 2003/0025649 A1 | 2/2003 | Willson et al. |
| 2005/0046803 A1 | 3/2005 | Akutsu |
| 2005/0046804 A1 | 3/2005 | Akutsu |

FOREIGN PATENT DOCUMENTS

| | | |
|---|---|---|
| JP | 10-171045 A | 6/1998 |
| JP | 2000-241874 A | 9/2000 |
| WO | WO 02/21832 A2 | 3/2004 |

* cited by examiner

Primary Examiner—Rodney Fuller
(74) Attorney, Agent, or Firm—Frishauf, Holtz, Goodman & Chick, P.C.

(57) ABSTRACT

A projection apparatus has a projection system including a spatial optical modulator (SOM), which projects an image according to an input image signal, and a projection lens, two retardation sensors and a ranging section, which measure distances corresponding to plural positions in an image projection plane, a key/indicator section provided with a "One-shot AFK" key, which instructs execution of keystone correction and focusing only once, and a "Continuous AFK" key, which instructs continuous execution thereof, and a control section which performs keystone correction on a light image to be formed by the SOM in such a way that a projected image becomes a rectangle with adequate aspect ratio based on distances acquired, focuses the projection lens at an arbitrary position in an image having undergone keystone correction, and controls number of times keystone correction and focusing are to be executed in response to an instruction from one of the keys.

14 Claims, 5 Drawing Sheets

PROJECTION APPARATUS, PROJECTION METHOD AND RECORDING MEDIUM HAVING RECORDED PROJECTION METHOD

BACKGROUND OF THE INVENTION

1. Field of the Invention

The present invention relates to a projection apparatus, a projection method and a recording medium having recorded a projection method.

2. Description of the Related Art

When conventional portable projectors display images, various adjustments are required. As a solution to this shortcoming, a portable projector which has a built-in monitor camera and which monitors a projection screen to automatically perform various adjustments needed to display images has been proposed as disclosed in, for example, Unexamined Japanese Patent Application KOKAI Publication No. 2000-241874.

However, the portable projector described in Unexamined Japanese Patent Application KOKAI Publication No. 2000-241874 processes image data picked up by the monitor camera and executes a focusing process and an adjustment of keystone deformation separately. This lengthens the time needed for the entire adjustment.

In addition, the specific adjustment operation changes the direction and elevation angle of the projection lens optical system. The adjustment requires that the lens system include an optical "camera movement" mechanism in the casing of the projector, thus enlarging and complicating the apparatus.

Recently, there has been proposed a portable projector equipped with an electronic adjustment capability. This portable projector first detects the distance between the projector and the projection screen and the angle of inclination to the projection optical axis by ranging means using a PSD (Position Sensitive Detector) sensor. Then, the projector acquires the focus position according to the detection results and forms an optical image previously deformed in the opposite direction to the detected inclination and projects the resultant image. Based on those results, the adjustment is made by correcting an image to be actually projected in such a way that the image becomes a rectangle with a normal aspect ratio.

Such a portable projector can execute various adjustments more easily and quickly. This portable projector, however, has different modes of instruction operations needed, such as selection and setting of detailed operation menu items, for a case where a user wants to promptly terminate various adjustments, and go to the actual projection operation (with poorer precision), and for a case where the user wants to execute various adjustments thoroughly to acquire accurate focusing and keystone correction and then go to the actual projection operation. To perform an operation as intended by the user, therefore, a complicated instruction operation must be performed, thus making it hard to reflect the user's intention.

SUMMARY OF THE INVENTION

According to one aspect of the invention, there is provided a projection apparatus comprising a projection section which projects an image according to an image signal to be input; a ranging section which measures each of distances corresponding to a plurality of positions in an image projection plane formed by the projection section; a keystone correcting section which performs keystone correction on an image to be projected by the projection section in such a way that a projected image becomes a rectangle with an adequate aspect ratio based on each distance acquired by the ranging section; a focus control section which focuses an image to be projected by the projection section at an arbitrary position in an image having undergone keystone correction in the keystone correcting section; a first instruction section which instructs execution of keystone correction and focusing only once; a second instruction section which instructs continuous execution of keystone correction and focusing; and a control section which controls the number of times keystone correction and focusing are to be executed by the ranging section, the keystone correcting section and the focus control section in response to an instruction from the first or second instruction section.

According to the second aspect of the invention, there is provided a projection method comprising a projection step of projecting an image according to an image signal to be input; a ranging step of measuring each of distances corresponding to a plurality of positions in an image projection plane formed at the projection step; a keystone correcting step of performing keystone correction on an image to be projected at the projection step in such a way that a projected image becomes a rectangle with an adequate aspect ratio based on each distance acquired at the ranging step; a focus control step of focusing an image to be projected at the projection step at an arbitrary position in an image having undergone keystone correction at the keystone correcting step; a first instruction step of instructing execution of keystone correction and focusing only once; a second instruction step of instructing continuous execution of keystone correction and focusing; and a control step of controlling the number of times keystone correction and focusing are to be executed at the ranging step, the keystone correcting step and the focus control step in response to an instruction given at the first or second instruction step.

According to the third aspect of the invention, there is provided a recording medium having recorded a projection method comprising a projection step of projecting an image according to an image signal to be input; a ranging step of measuring each of distances corresponding to a plurality of positions in an image projection plane formed at the projection step; a keystone correcting keystone step of performing keystone correction on an image to be projected at the projection step in such a way that a projected image becomes a rectangle with an adequate aspect ratio based on each distance acquired at the ranging step; a focus control step of focusing an image to be projected at the projection step at an arbitrary position in an image having undergone keystone correction at the keystone correcting step; a first instruction step of instructing execution of keystone correction and focusing only once; a second instruction step of instructing continuous execution of keystone correction and focusing; and a control step of controlling the number of times keystone correction and focusing are to be executed at the ranging step, the correcting step and the focus control step in response to an instruction given at the first or second instruction step.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

One embodiment of the present invention as adapted to a projector apparatus will be described below with reference to the accompanying drawings.

Figure 1:
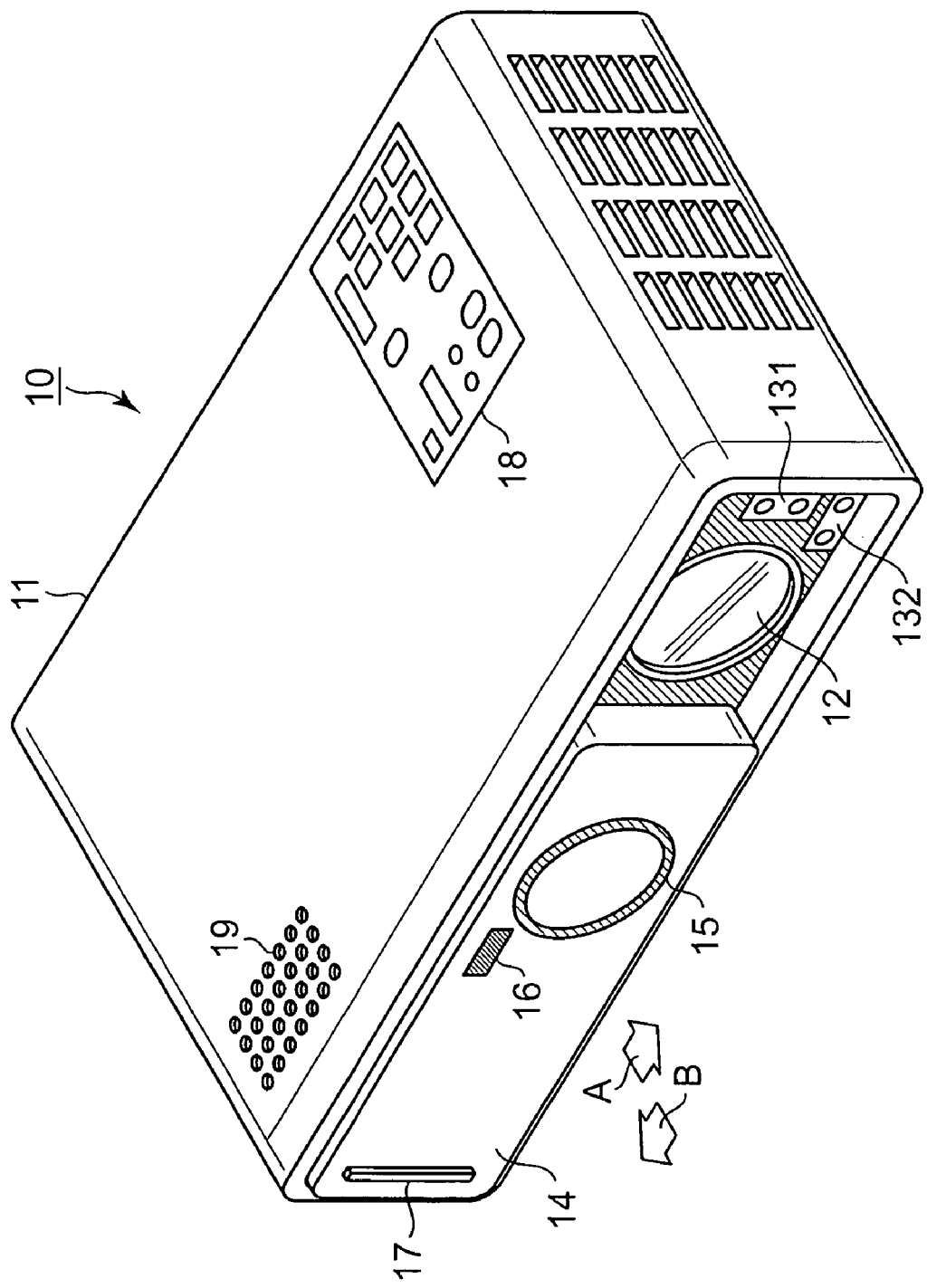
FIG. 1 is a perspective view showing the outer structure of a projector apparatus according to one embodiment of the present invention.

FIG. 1 shows the outer structure of a projector apparatus 10 according to the embodiment. As shown in the diagram, the projector apparatus 10 has a projection lens 12, two pairs of retardation sensors 131, 131 and 132, 132 and a front cover 14 provided at the front of a parallelepiped body casing 11.

The projection lens 12 (projection section) projects an optical image formed by a spatial optical modulator (SOM) 27 (projection section), such as a micromirror device to be discussed later. The projection lens 12 can arbitrarily change the focus position and the zoom position (projection angle of view).

Each of the retardation sensors 131 and 132 measures the distance to a subject (specifically, the distance to a projection image plane) from the parallax with respect to the subject image based on the principle of triangle ranging.

More specifically, a pair of retardation sensors 131 arranged vertically measure the vertical distance to the subject. Another pair of retardation sensors 132 arranged horizontally measure the horizontal distance to the subject.

The front cover 14 serves to protect the projection lens 12 and the retardation sensors 131 and 132 at the other time than the time of projection by the projector apparatus 10, particularly, when the projector apparatus 10 is carried around. The front cover 14 is slidable as indicated by arrows A and B in the diagram, and a light storage ring 15, an Ir reception section 16 and a slide bar 17 are provided at the top surface of the front cover 14.

The light storage ring 15 is formed by burying a resin ring containing a semitransparent light storage material in the front cover 14. The presence of the light storage ring 15 can allow a user to see if the light source of the projector apparatus 10 is on and light is irradiated from the projection lens 12 even when the front cover 14 is closed to disable observation of the projection lens 12, etc. from outside. The use of the light storage material ensures slight light emission even when the lamp of the light source is turned off, so that the user can see the location of the light storage ring 15 under a dark environment. The light storage ring 15 also puts the accent on the design of the flat front cover 14.

A key/indicator section 18 and a speaker 19 are provided on the top surface of the body casing 11.

The details of the key/indicator section 18 will be given later.

The speaker 19 amplifies and outputs sounds reproduced, for example, at the time of playing back moving pictures.

Though not illustrated in FIG. 1, an input/output connector section 21, an Ir reception section 35 similar to the Ir reception section 16, an AC adaptor connector section, etc. are provided at the back of the body casing 11. A pair of fixing legs are attached to the bottom of the body casing 11 at the rear side, and a single high-adjustable adjustment leg is attached to the front side.

Figure 2:
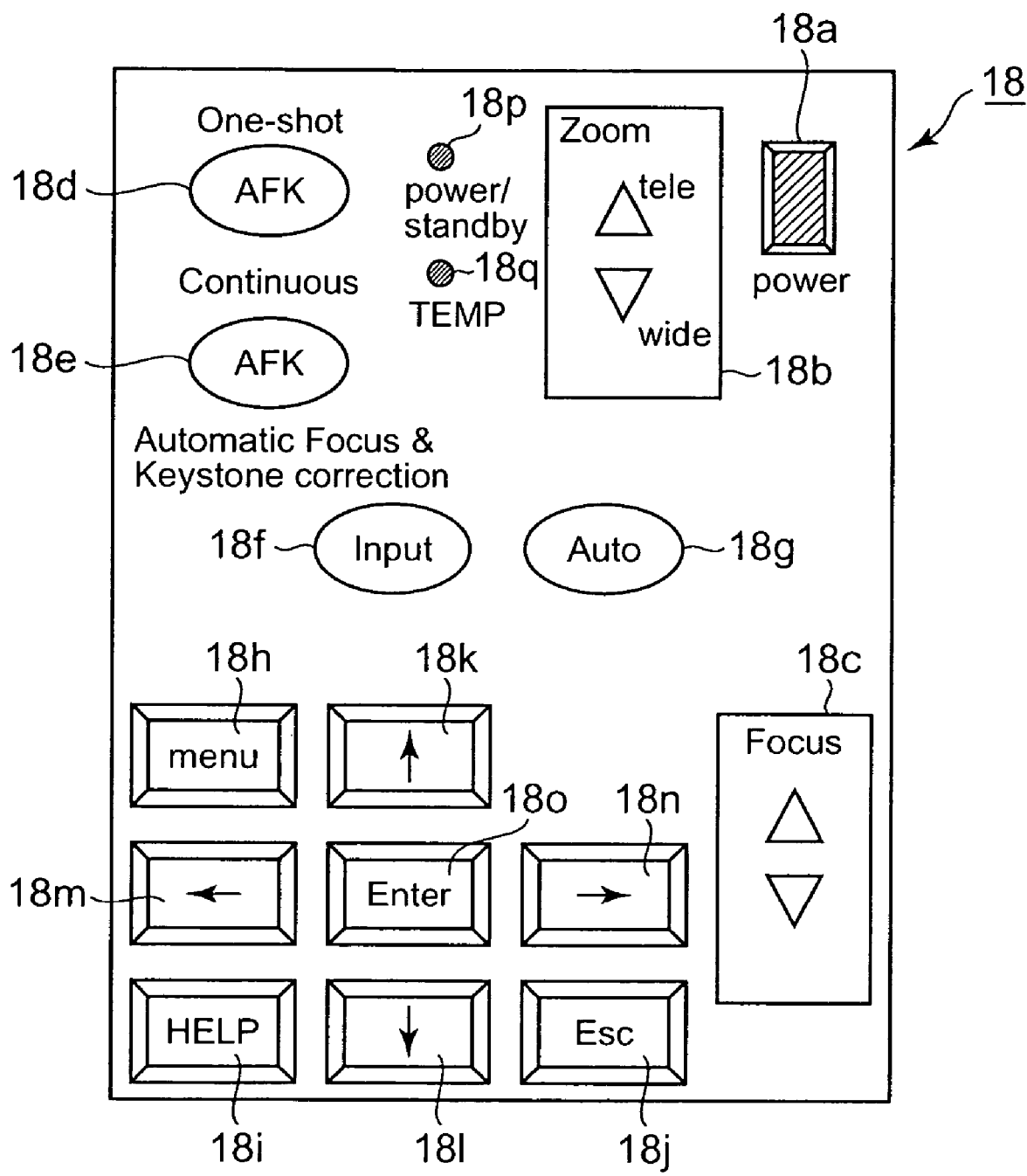
FIG. 2 is a diagram exemplifying the specific layout of elements of a key/indicator section according to the embodiment.

FIG. 2 exemplifies the detailed layout of the elements of the key/indicator section 18. As illustrated, the key/indicator section 18 includes a power key 18a, a zoom key 18b, a focus key 18c, a "One-shot AFK" key 18d, a "Continuous AFK" key 18e, an "Input" key 18f, an "Auto" key 18g, a "menu" key 18h, a "HELP" key 18i, an "Esc" key 18j, an "Up (↑) key 18k, a "Down (↓) key 18l, a "left (←) key 18m, a "right (→) key 18n, an "Enter" key 18o, a power/standby indicator 18p and a temperature (TEMP) indicator 18q.

The power key 18a instructs on/off of the power.

The zoom key 18b instructs zoom up (tele) and zoom down (wide) by manipulation of buttons "Δ" and "∇".

The focus key 18c instructs to forward movement and backward movement by manipulation of buttons "Δ" and "∇".

The "One-shot AFK" key 18d (first instruction section) instructs instantaneous execution of automatic focus and automatic keystone correction only once.

The "Continuous AFK" key 18e (second instruction section) instructs the initiation and termination of execution of continuous automatic focus and automatic keystone correction.

The "Input" key 18f instructs the manual switching of an image signal input to any of the terminals of the input/output connector section 21. The "Auto" key 18g instructs the automatic switching of an image signal input to any of the terminals of the input/output connector section 21.

The "menu" key 18h instructs the display of various menu items associated with the projection operation.

"HELP" key 18i instructs the display of various kinds of help information when an instruction operation is unclear, and the "Esc" key 18j instructs releasing of the operation upon manipulation.

The "Up (↑) key 18k, the "Down (↓) key 18l, the "left (←) key 18m and the "right (→) key 18n are manipulated when instructing selection or the moving direction with regard to the menu items, the manual keystone correction direction, the pointer and cursor or so, upon manipulation.

The power/standby indicator 18p indicates the power on/off state and the state of no image signal input by turning LEDs of, for example, green and red on or off or flickering the LEDs.

Figure 3:
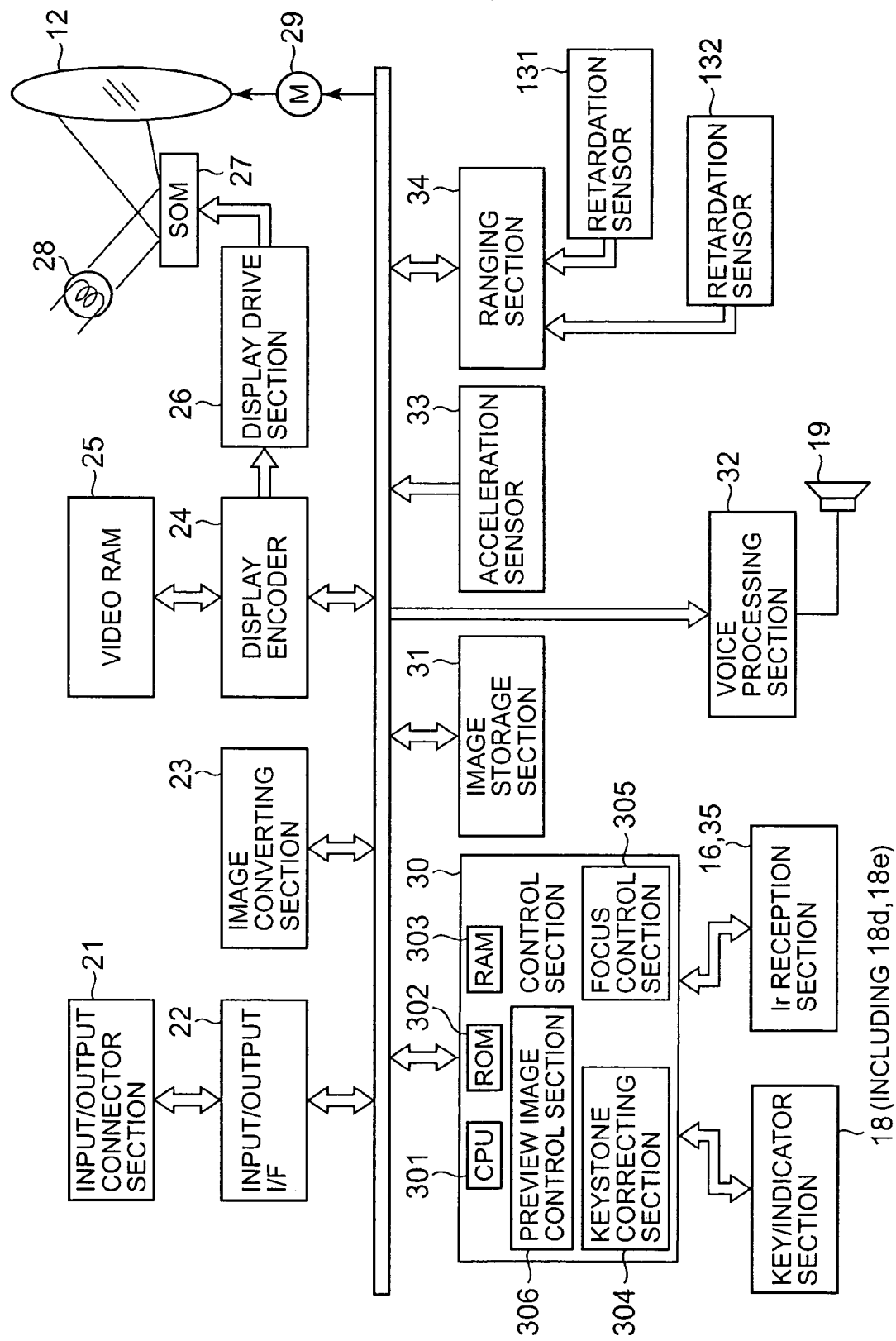
FIG. 3 is a block diagram showing the function structure of an electronic circuit of the projector apparatus according to the embodiment.

The function structure of the electronic circuit of the projector apparatus 10 will be discussed below referring to FIG. 3. In the diagram, image signals of various kinds of standards input from the input/output connector section 21 are sent via a system bus SB to an input/output interface (I/F) 22 where the formats of the signals are converted to a predetermined format. Then, the image signals are sent to a display encoder 24.

The display encoder 24 stores the supplied image signals into a video RAM 25. The display encoder 24 then generates video signals from the memory contents of the video RAM 25 and sends the video signals to a display drive section 26.

The display drive section 26 adequately changes the frame rate according to the image signals supplied, and drives the SOM 27 at a rate of, for example 30 frames/sec. Then, the display drive section 26 irradiates white light of high luminance emitted by a light source lamp 28, such as a super-high pressure mercury lamp, 5 to the SOM 27. As a result, an optical image is formed by reflected light of the white light and is projected on an unillustrated screen via the projection lens 12.

The projection lens 12 adequately shifts the zoom position and the focus position when driven by a lens motor (M) 29.

A control section 30 performs the general operational control of the individual circuits. The control section 30 includes a CPU 301, a focus control section 305 which performs automatic focus to be discussed later, a keystone correcting section 304 which performs automatic keystone correction to be discussed later, a preview image control section 306 which projects a preview image, a ROM 302 where an operation program to be run by the CPU 301 is stored in a read only manner, and a RAM 303 which is used as a work memory.

An image storage section 31, a voice processing section 32, an acceleration sensor 33 and a ranging section 34 are connected to the control section 30 via the system bus SB.

The image storage section 31, which is comprised of, for example, a flash memory or so, stores image data of charge images (horizontal chart image and vertical chart image), a preview image and so forth. The control section 30 reads image data, stored in the image storage section 31, as needed, sends the image data to the display encoder 24, and projects the images by means of the projection lens 12.

The voice processing section 32 has a sound source circuit, such as a PCM sound source. The voice processing section 32 converts sound data, given at the time of performing a projection operation, to analog data, and drives the speaker 19 to generate the analog data.

When the projector apparatus 10 is moved from the set state, the acceleration sensor 33 detects vibration originated from the movement and sends a detection signal to the control section 30.

The ranging section 34 drives the retardation sensors 131 and 132 to measure the distance to the position of an arbitrary point in a projected chart image.

A key operation signal from the key/indicator section 18 is input directly to the control section 30, which in turn directly turns on or flickers the power/standby indicator 18*p* and the temperature indicator 18*q* of the key/indicator section 18. Infrared ray reception signals from the Ir reception section 16 provided at the slide bar 17 and the Ir reception section 35 provided at the back of the body casing 11 are also input directly to the control section 30.

Figure 4:
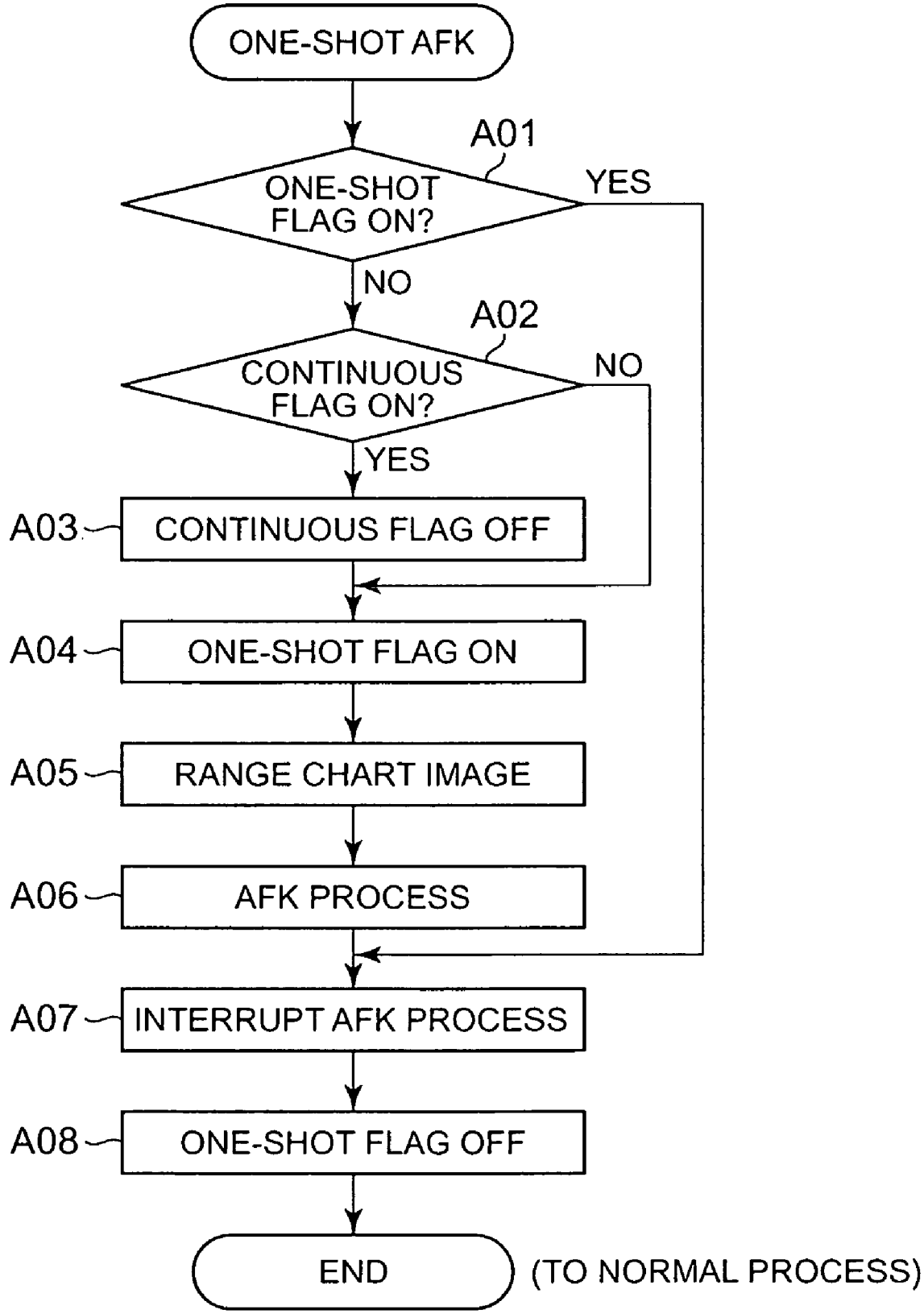
FIG. 4 is a flowchart illustrating the contents of a sequence of processes associated with the "One-shot AFK" key operation according to the embodiment.

The operation of the embodiment will be described below. FIG. 4 is a flowchart illustrating the contents of a sequence of processes for automatic focus and automatic keystone correction as an interruption process which is forcibly executed when the "One-shot AFK" key 18*d* of the key/indicator section 18 is manipulated with the power set on. The control section 30 controls and executes the sequence of processes based on the operation program stored in the internal ROM.

First, the control section 30 determines whether a one-shot flag indicating that only single processing of automatic focus and automatic keystone correction is underway as a result of the manipulation of the "One-shot AFK" key 18*d* is ON or not (step A01).

When the control section 30 decides that the one-shot flag is OFF (step A01: NO), the control section 30 then determines whether a continuous flag indicating that continuous processing of automatic focus and automatic keystone correction is underway as a result of the manipulation of the "Continuous AFK" key 18*e* or not (step A02).

Only when the control section 30 decides that the continuous flag is ON (step A02: YES), the control section 30 sets the continuous flag off to nullify the manipulation of the "Continuous AFK" key 18*e* operated before (step A03).

Then, the control section 30 sets the one-shot flag on again (step A04), and reads image data of a chart image from the image storage section 31 and projects the image data. In association with the displayed chart image, the control section 30 causes the retardation sensors 131 and 132 to measure the distances to positions of plural points constituting the chart image (step A05).

Next, based on those pieces of ranging data, the control section 30 computes the distance to a reference point position and the inclination of the projection plane. Based on the computation results, the control section 30 executes automatic focus and automatic keystone correction (which is generally called "AFK process" in the diagram) (step A06).

When only single processing of automatic focus and automatic keystone correction is executed in this manner, the control section 30 interrupts the process corresponding to the manipulation of the "One-shot AFK" key 18*d* (step A07), and sets the one-shot flag off (step A08). After the step, the control section 30 terminates the processing corresponding to the manipulation of the "One-shot AFK" key 18*d* in FIG. 4, and returns to the normal projection operation.

When the control section 30 decides at step A01 that the one-shot flag has already been set on (step A01: YES), the control section 30 decides that the "One-shot AFK" key 18*d* has already been manipulated immediately before, only single processing of automatic focus and automatic keystone correction is underway, and the "One-shot AFK" key 18*d* has been manipulated again to cancel the operation in progress. Then, the control section 30 immediately goes to step A07 and interrupts processing corresponding to the manipulation of the "One-shot AFK" key 18*d*.

When the user wants to promptly terminate various adjustments, a little poor the precision is though, and go to the actual projection operation, or in a similar case, the user can go to the normal projection operation after adjustment done by executing only single processing of automatic focus and automatic keystone correction by manipulating the "One-shot AFK" key 18*d*.

Figure 5:
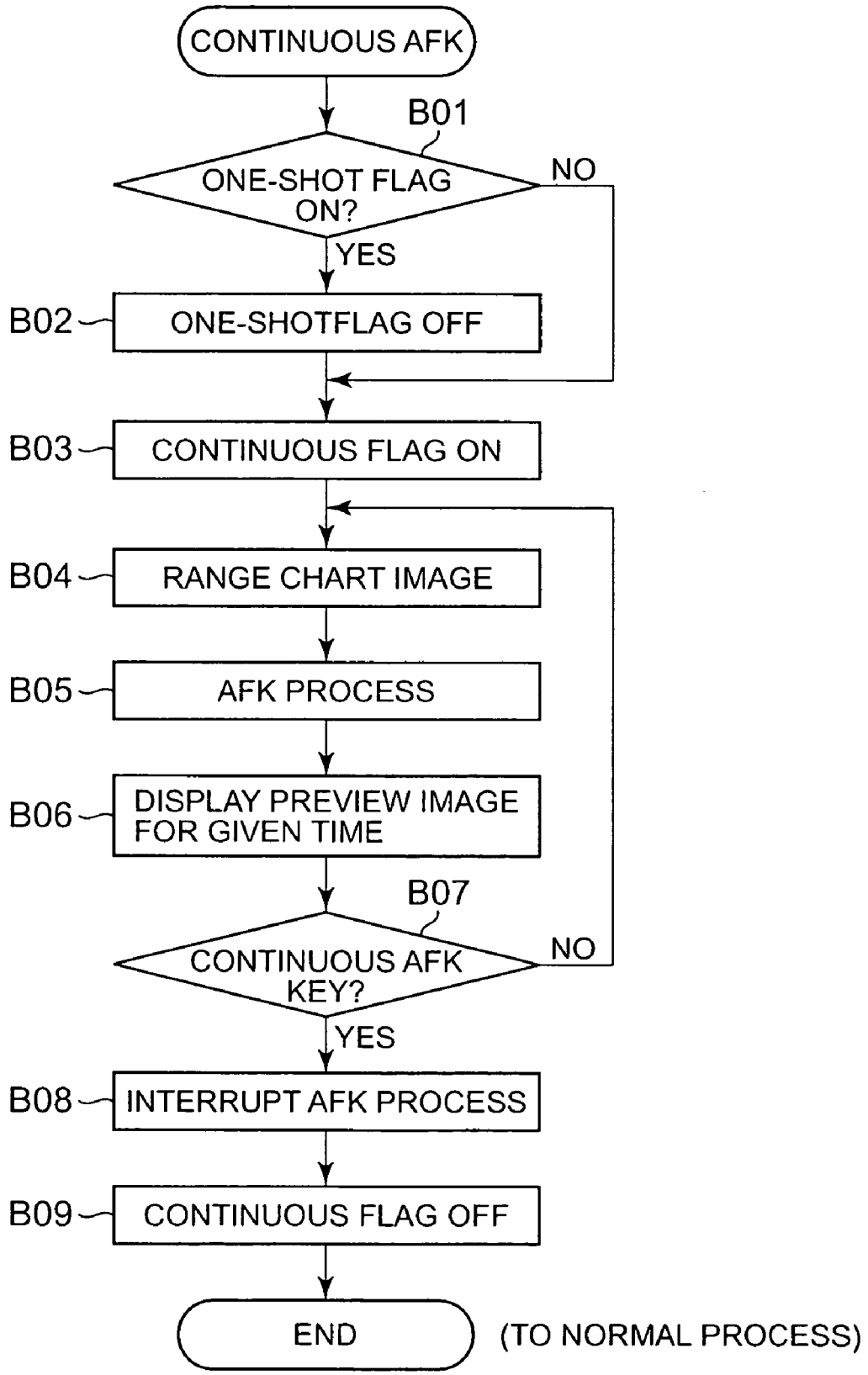
FIG. 5 is a flowchart illustrating the contents of a sequence of processes associated with the "Continuous AFK" key operation according to the embodiment.

Referring now to a flowchart in FIG. 5, a description will be given of the contents of a sequence of processes for automatic focus and automatic keystone correction as an interruption process which is forcibly executed when the "Continuous AFK" key 18*e* of the key/indicator section 18 is manipulated with the power set on. The sequence of processes in FIG. 5 is also controlled by the control section 30 based on the operation program stored in the internal ROM.

First, the control section 30 determines whether the one-shot flag indicating that only single processing of automatic focus and automatic keystone correction is underway as a result of the manipulation of the "One-shot AFK" key 18*d* is ON or not (step B01).

Only when the control section 30 decides that the one-shot flag is ON (step B01: YES), the control section 30 sets the one-shot flag off to nullify the manipulation of the "One-shot AFK" key 18*d* operated before. Then, the control section 30 interrupts single processing of automatic focus and automatic keystone correction in progress (step B02).

Then, the control section 30 sets the continuous flag on again (step B03), and reads image data of a chart image from the image storage section 31 and projects the image data. In association with the displayed chart image, the control section 30 causes the retardation sensors 131 and 132 to measure the distances to positions of plural points constituting the chart image (step B04).

Next, based on those pieces of ranging data, the control section 30 computes the distance to a reference point position and the inclination of the projection plane. Based on the computation results, the control section 30 executes automatic focus and automatic keystone correction (which is generally called "AFK process" in the diagram) (step B05).

When automatic focus and automatic keystone correction are carried out in this manner, the control section 30 reads predetermined image data, different from the one used in the ranging process, from the image storage section 31 based on the results of the operation. Then, the control section 30 projects and displays the image data as a preview image for a given time (step B06).

The image data that is read from the image storage section 31 has been prepared by the user beforehand as data which makes automatic focus and automatic keystone correction easier to observe, and is an image whose size (shape) is indicated by a square frame or whose four corners are marked. Given that the time needed for automatic focus and automatic keystone correction at step B04 or B05 is 0.5 second or so, for example, the projection time should be set to a time slightly longer than the required time, e.g., 1.0 to 2.0 seconds or so.

With the focus state and keystone correction state presented to the user, the control section 30 determines whether the manipulation of the "Continuous AFK" key 18e is made again or not (step B07). When the "Continuous AFK" key 18e is not manipulated, the control section 30 returns to a sequence of processes starting at step B04 again, and repeats a similar operation with a higher precision while referring to the results of the automatic focus and automatic keystone correction done so far.

The control section 30 gradually increases the precision of automatic focus and automatic keystone correction by repeatedly executing the processes of steps B04 to B07, and projects a preview image corresponding to the results of executing each sequence at a time. This can allow the user to accurately determine whether the focus state and the keystone correction state are in the states desired by the user.

When the control section 30 decides at step B07 that the "Continuous AFK" key 18e has been manipulated for the second time (step B07: YES), on the other hand, the control section 30 interrupts the continuous automatic focus and automatic keystone correction (step B08), and sets the continuous flag off (step B09). After the step, the control section 30 terminates the processing corresponding to the manipulation of the "Continuous AFK" key 18e in FIG. 5, and returns to the normal projection operation.

As the "Continuous AFK" key 18e is manipulated, automatic focus and automatic keystone correction can be continuously executed over a certain period of time. This can easily achieve the transition to the actual projection operation after the accurate focus state and keystone correction state are acquired.

As apparent from the foregoing description, as the user manipulates the "One-shot AFK" key 18d and the "Continuous AFK" key 18e in the key/indicator section 18 separately according to the need, the intention of the user at the time of the key manipulation can be reflected. Then, the projector apparatus 10 can easily and promptly perform automatic focus and automatic keystone correction on a projection image so that the image can be projected and displayed accurately regardless of the projection environment.

In addition, the projector apparatus 10 does not continuously execute a sequence of processes by a predetermined number of times, but continuously executes keystone correction and focusing during a period of time from the initiation of keystone correction and focusing as instructed by the first manipulation of the "Continuous AFK" key 18e to the second manipulation of the "Continuous AFK" key 18e. As the user observes the focus state and the keystone correction state and then gives the second instructive manipulation when satisfied with the states, the user can surely acquire the desired focus state and keystone correction state.

In this case, as a preview image easier for the user to see is projected, the user can easily observe the states while executing continuous keystone correction and focusing. Therefore, the projector apparatus 10 can terminate keystone correction and focusing at the point the user decides as adequate, and can go to the subsequent projection operation without continuing the operation for keystone correction and focusing wastefully.

The operation originated from the manipulation of the "One-shot AFK" key 18d and the operation originated from the manipulation of the "Continuous AFK" key 18e are designed in such a way that even when one of the operations is in progress, the operation up to the point of the manipulation of the other key is interrupted immediately and the operation associated with the newly manipulated key takes place. This makes it possible to always start executing keystone correction and focusing by the number of times that is decided by the priority of the key manipulation made by the user.

In the foregoing description of the embodiment a sequence of operations has been explained as being executed in response to the manipulation of the "One-shot AFK" key 18d and the "Continuous AFK" key 18e in the key/indicator section 18. However, an unillustrated remote controller may be designed to have keys similar to those of the key/indicator section 18, so that as the Ir reception section 16 or 35 receives a key operation signal generated by the manipulation of any of the keys, similar operations are carried out.

The present invention is not limited to the embodiment, but can be modified in various other forms without departing from the scope and spirit of the invention.

Further, the above-described embodiment includes various stages of subject matters of the invention, so that various subject matters can be achieved by adequately combining plural components disclosed. If some of the entire components disclosed in the foregoing description of the embodiment are eliminated, for example, the structure without the eliminated components can be extracted as one subject matter of the invention when at least one of the problems discussed in the DESCRIPTION OF THE RELATED ART can be overcome and at least one of the effects discussed in the last part of the DETAILED DESCRIPTION OF THE PREFERRED EMBODIMENT is brought about.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2004-4239 filed on Jan. 9, 2004 and including specification, claims, drawings and summary. The disclosure of the above Japanese Patent Application is incorporated herein by reference in its entirety.

What is claimed is:

1. A projection apparatus comprising:
   a projection section which projects an image in accordance with an input image signal;
   a ranging section which measures respective distances to each of a plurality of positions in an image projection plane formed by said projection section;
   a keystone correcting section which performs keystone correction on an image to be projected by said projection section in such a way that a projected image becomes a rectangle with an adequate aspect ratio, based on the distances acquired by said ranging section;
   a focus control section which focuses the image to be projected by said projection section at an arbitrary position in the image that has undergone keystone correction in said keystone correcting section;
   a first instruction switch which instructs execution of one-shot keystone correction and focusing, said first instruction switch being selectively operable by a user;
   a second instruction switch which instructs execution of continuous keystone correction and focusing, said second instruction switch being selectively operable by the user; and
   a control section which controls a number of times that said ranging section, said keystone correcting section and said focus control section are operated to perform keystone correction and focusing in response to an instruction from one of said first instruction switch and said second instruction switch.

2. The projection apparatus according to claim 1, wherein said second instruction switch instructs initiation and termination of the continuous keystone correction and focusing.

3. The projection apparatus according to claim 1, wherein when one of said one-shot keystone correction and focusing and said continuous keystone correction and focusing is in progress when a new instruction is given by one of said first and second instruction switches to perform the other of said one-shot keystone correction and focusing and said continuous correction and focusing, said control section immediately starts executing keystone correction and focusing in accordance with said new instruction.

4. The projection apparatus according to claim 1, further comprising:
   a preview image control section which controls said projection section to project a preview image, which corresponds to a current state of keystone correction and focusing, for a given time each time one cycle of respective operations of said ranging section, said keystone correcting section and said focus control section is performed during execution of the continuous keystone correction and focusing.

5. The projection apparatus according to claim 1, further comprising:
   an image storage section which stores a chart image that is projected for ranging by said ranging section.

6. The projection apparatus according to claim 5, wherein said image storage section stores a predetermined image to be projected as said preview image by said preview image control section.

7. A projection method comprising:
   receiving an instruction via first and second switches which are selectively operable by a user to execute one of: (i) one-shot keystone correction and focusing, and (ii) continuous keystone correction and focusing;
   measuring respective distances to each of a plurality of positions in an image projection plane to which an image is to be projected;
   performing keystone correction on an image to be projected in such a way that a projected image becomes a rectangle with an adequate aspect ratio, based on the measured distances;
   focusing the image to be projected at an arbitrary position in the image that has undergone keystone correction; and
   controlling a number of times that said measuring, said keystone correction, and said focusing are performed, in accordance with which one of said one-shot keystone correction and focusing and said continuous keystone correction and focusing has been instructed.

8. The projection method according to claim 7, wherein a first received instruction for said continuous keystone correction and focusing initiates said continuous keystone correction and focusing, and a second-received instruction for said continuous keystone correction and focusing terminates said continuous keystone correction and focusing.

9. The projection method according to claim 7, wherein when one of said one-shot keystone correction and focusing and said continuous keystone correction and focusing is in progress when a new instruction is given by one of said first and second switches to perform the other of said one-shot keystone correction and focusing and said continuous correction and focusing, keystone correction and focusing is immediately controlled to be executed in accordance with said new instruction.

10. The projection apparatus according to claim 7, further comprising:
    protecting a preview image, which corresponds to a current state of keystone correction and focusing, for a given time each time one cycle of said measuring, said keystone correction, and said focusing is performed during execution of the continuous keystone correction and focusing.

11. A computer readable recording medium having a program stored thereon that is executable by a CPU of a projection apparatus to cause the projection apparatus to execute a projection method comprising:
    receiving an instruction via first and second switches which are selectively operable by a user to execute one of: (i) one-shot keystone correction and focusing, and (ii) continuous keystone correction and focusing;
    measuring respective distances to each of a plurality of positions in an image projection plane to which an image is to be projected;
    performing keystone correction on an image to be projected in such a way that a projected image becomes a rectangle with an adequate aspect ratio, based on the measured distances;
    focusing the image to be projected at an arbitrary position in the image that undergone keystone correction; and
    controlling a number of times that said measuring, said keystone correction, and said focusing are performed, in accordance with which one of said one-shot keystone correction and focusing and said continuous keystone correction and focusing has been instructed.

12. The recording medium according to claim 11, wherein a first received instruction for said continuous keystone correction and focusing initiates said continuous keystone correction and focusing, and a second-received instruction for said continuous keystone correction and focusing terminates said continuous keystone correction and focusing.

13. The recording medium according to claim 11, wherein when one of said one-shot keystone correction and focusing and said continuous keystone correction and focusing is in progress when a new instruction is given by one of said first and second switches to perform the other of said one-shot keystone correction and focusing and said continuous correction and focusing, keystone correction and focusing is immediately controlled to be executed in accordance with said new instruction.

14. The recording medium according to claim 11, further comprising:

projecting a preview image, which corresponds to a current state of keystone correction and focusing, for a given time each time one cycle of said ranging, said keystone correction, and said focusing is performed during execution of the continuous keystone correction and focusing.

* * * * *